United States Patent [19]

Potzas

[11] Patent Number: 5,014,938

[45] Date of Patent: May 14, 1991

[54] DEVICE FOR RELIEVING THE STRAIN ON CABLES

[76] Inventor: Peter Potzas, Am Rinnerborn 58, D-6305 Alten-Buseck, Fed. Rep. of Germany

[21] Appl. No.: 399,542

[22] PCT Filed: Feb. 17, 1988

[86] PCT No.: PCT/DE88/00078

§ 371 Date: Aug. 17, 1989

§ 102(e) Date: Aug. 17, 1989

[87] PCT Pub. No.: WO88/06352

PCT Pub. Date: Aug. 25, 1988

[30] Foreign Application Priority Data

Feb. 20, 1987 [DE] Fed. Rep. of Germany ....... 3705413

[51] Int. Cl.$^5$ ............ F16L 5/00

[52] U.S. Cl. ............ 248/56; 174/153 G

[58] Field of Search ............ 248/56, 27.3; 174/152 G, 153 G, 65 G; 439/449, 463; 285/162, 322

[56] References Cited

U.S. PATENT DOCUMENTS 4,169,572 10/1979 Simon ............ 174/153 G X
4,354,651 10/1982 Simon ............ 174/153 G X
4,432,520 2/1984 Simon ............ 174/153 G X
4,436,265 3/1984 Simon ............ 174/153 G X
4,474,489 10/1984 Simon ............ 174/65 G X
4,839,937 6/1989 Oikawa et al. ............ 248/56 X

FOREIGN PATENT DOCUMENTS 2309054 11/1976 France .
612797 8/1979 Switzerland .

*Primary Examiner*—Ramon O. Ramirez
*Attorney, Agent, or Firm*—Browdy and Neimark

[57] ABSTRACT

A device for relieving the strain on cables, in particular mains supply cables to housings of electrical equipment, consists of two parts fitted into one another approximately concentrically, of which the outer part (1) can be fastened in a housing opening and the inner part (2) is rotatably mounted in the outer part (1), a central lead-through opening (14) for the cable, and also clamping fingers (12) which protrude into the lead-through opening (14), can be swivelled into the lead-through opening (14) by rotation of the inner part (2) relative to the outer part (1) and can be locked in a clamping position. In order to achieve a more reliable clamping grip and a simpler assembly, the swivelling direction of the clamping fingers (12) runs approximately transversely to the longitudinal axis of the cable lead-through opening (14), the clamping fingers (12) being arranged on the outer part (1) and lying approximately in the direction of the cable lead-through opening (14). Run-up lobes (19) for actuating the clamping fingers (12) sitting on the outer part (1) are provided on the inner surface of the inner part (2). Four clamping fingers (12) arranged in a uniformly distributed manner over the periphery are preferably provided.

14 Claims, 6 Drawing Sheets

DEVICE FOR RELIEVING THE STRAIN ON CABLES

Figure 1:
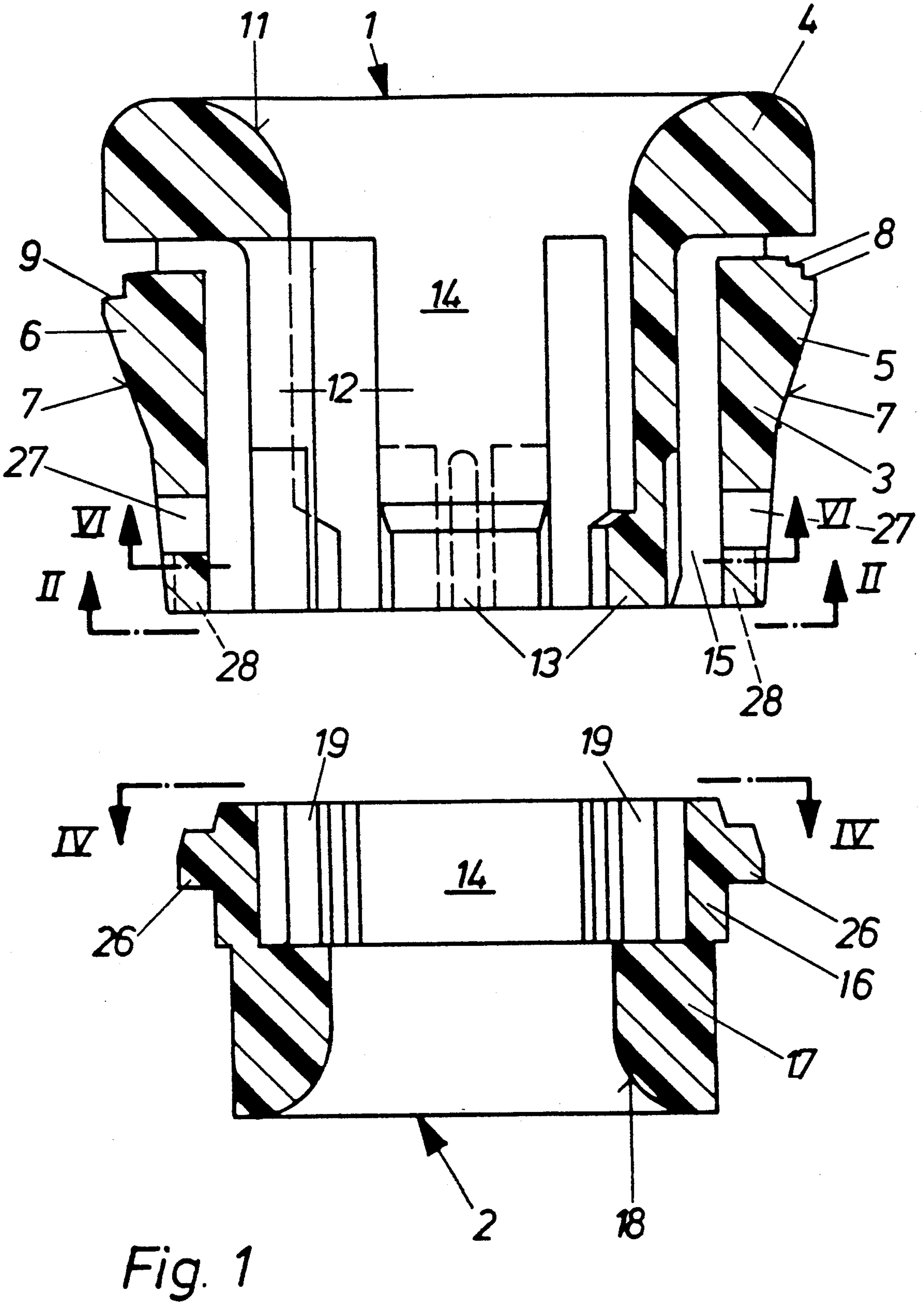

The invention relates to a device for relieving the strain on cables, in particular mains supply cables to housings of electrical equipment, consisting of two parts fitted into one another approximately concentrically of which the outer part can be fastened in the housing opening and the inner part is mounted in the outer part so as to be rotatable around a lead-through opening for the cable, and also clamping fingers which protrude into the lead-through opening, can be swivelled into the lead-through opening by rotation of the inner part relative to the outer part and can be locked in a clamping position.

In a known device of the said type, the inner part has two clamping fingers which are directed inwards and are each moveable about a swivel axis running parallel to the longitudinal axis. The clamping fingers sitting on the inner part, which run up against projections on the outer part, are pressed inwards by rotation of the inner part. This design has the disadvantage that the cable also turns while the clamping grip is being set and shifts from the centre so that a defined clamping grip is not always possible. Furthermore, there is the disadvantage that the inner part has to be rotated through 90° relative to the outer part to produce the clamping grip, i.e. an applied open ring spanner or open-ended spanner has to be swivelled through 90° in order to produce the clamping fit. Since the connections often sit in housing corners or at locations where access is difficult, there is often not sufficient space for a tool movement of 90°.

The object of the invention is to design the device of the type mentioned at the beginning in such a way that a reliable clamping grip and a simpler assembly are possible.

According to the invention, this object is achieved when the swivelling direction of the clamping fingers runs approximately transversely to the longitudinal axis of the cable lead-through opening, that the clamping fingers are arranged on the outer part and lie approximately in the direction of the cable lead-through opening, and that run-up lobes for actuating the clamping fingers sitting on the outer part are provided on the inner surface of the inner part.

In the device according to the invention, when the clamping fit is being set, the clamping fingers, which sit on the outer part, do not turn at the same time; on the contrary, only the inner part is rotated, which, with its run-up lobes, presses the clamping fingers against the cable to be secured. In this respect, satisfactory centring of the cable between the clamping fingers is possible without the cable being displaced from its central position while the clamping fit is being produced.

As a result of the design according to the invention, it is also readily possible to provide three or more clamping fingers which are arranged in a uniformly distributed manner over the periphery. Four clamping fingers, each arranged so as to be offset by 90$o@ relative to one another, are preferably provided. Due to the larger number of clamping fingers, absolutely reliable centring of the cable and consequently an optimum fit in the device for relieving the strain are possible.

To secure flat cables, however, only two clamping fingers, which act on the flat sides of the cable, are required.

On account of the design according to the invention, in which the clamping fingers sitting on the outer part are actuated by run-up lobes of the inner part, a very short rotational displacement can be selected to achieve the clamping position, as a result of which the assembly is considerably simplified. In a preferred embodiment having four clamping fingers, a rotational angle of about 45° between the inactive position and the clamping position is sufficient. Also, only a very slight frictional pressure is transmitted to the outer part during the clamping action so that turning of the outer part in a housing bore can be eliminated.

The clamping fingers conveniently sit on the head of the outer part, extend up to the other end of the outer part and are provided at their free ends with clamping jaws are directed radially inwards and, when the device is being closed, press against the cable to be secured. Thus a relatively long swivel arm is available for swivelling the clamping jaws from the inactive position into the clamping position so that the stress imposed on the material is very light.

At least the outer part can be made of elastic plastic, the clamping fingers being integrally formed in one piece on the head of the outer part. In contrast, the inner part, which is provided with the run-up lobes, can be made of reinforced material, since no moveable parts have to be integrally formed on it.

A functional area for applying a tool is preferably formed on the end of the inner part protruding out of the outer part, namely, for example, an external hexagon which can be turned with a normal open-ended spanner. Since the inner part, as described above, can be made of very firm material, the external hexagon withstands forcible application of a tool so that a tight fit, which can also be easily released again, can be created without damaging the device.

An outer supporting sleeve can adjoin the head of the outer part, which supporting sleeve extends over the entire length of the outer part and engages into the housing opening, an annular clearance space being present between the supporting sleeve and the clamping fingers, into which clearance space the inner part can be inserted from the side remote from the head of the outer part. Such a design is especially advantageous, since it enables a harmonic interplay between the individual parts.

In the inactive, unclamped position, the inwardly directed run-up lobes of the inner part can here lie between the clamping fingers sitting on the outer part so that there is sufficient space for inserting the cable.

A run-up slope which has allocated to it a corresponding mating slope on the respective clamping finger is conveniently formed on each run-up lobe.

Each run-up lobe, in its area projecting furthest inwards, is preferably provided with a catch projection which has allocated to it a catch recess on the rear side of each clamping finger. A defined clamping position is thus created into which the part for the operator engages in such a way that it can be sensed and heard. This catch position at the same time also provides additional protection against an undesired release, for a larger torque than normally required to turn the inner part releative to the outer part has to be applied to lift the catch projections out of the catch recesses.

At least one projection directed radially outwards is conveniently provided on the outer surface of the inner part, which projection engages into an annular space or annular slot formed on the inner surface of the supporting sleeve and running transversely to the longitudinal direction. This engagement serves to hold the inner part positively in the outer part.

The length of the annular slot preferably corresponds to the rotational displacement of the inner part from the inactive position into the clamping position. Actuation of the device consequently becomes even simpler, since this measure prevents the parts from being turned beyond the clamping position.

A longitudinal groove which connects the annular slot to the free end of the supporting sleeve can be provided on the inner surface of the supporting sleeve. The depth of the longitudinal groove can here be larger than or the same as the height of the projection on the outer side of the inner sleeve, as a result of which the insertion of the inner part into the outer part is facilitated.

However, the depth of the longitudinal groove is preferably slightly smaller than the height of the respective locking projection. Although insertion is consequently slightly more difficult and takes place with slight deformation of the parts, this design ensures that the inner part, when it assumes its final position, engages with its locking projections into the annular groove so that an axial fixing is ensured in every angular position of the inner part relative to the outer part.

Figure 2:
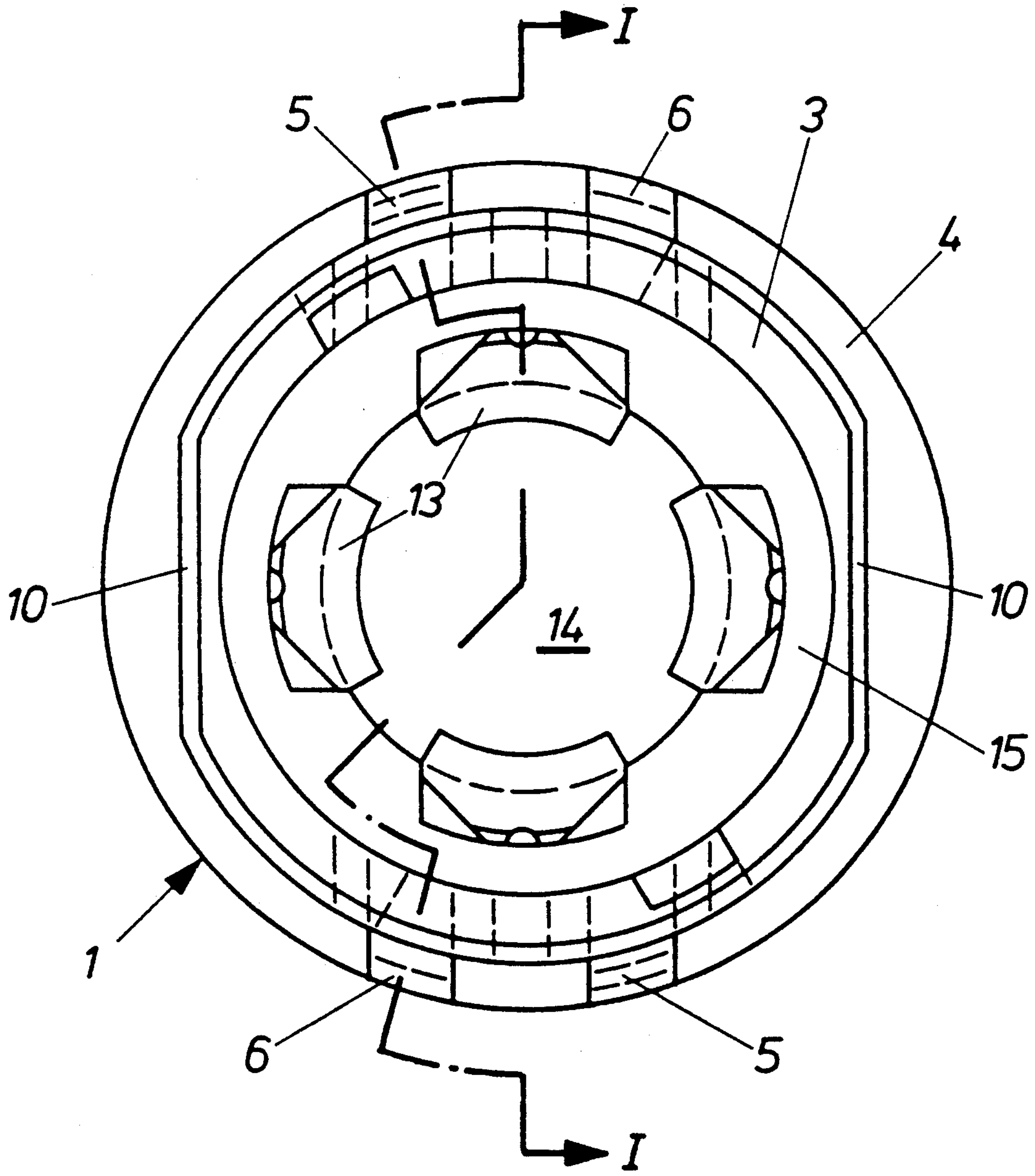
Figure 3:
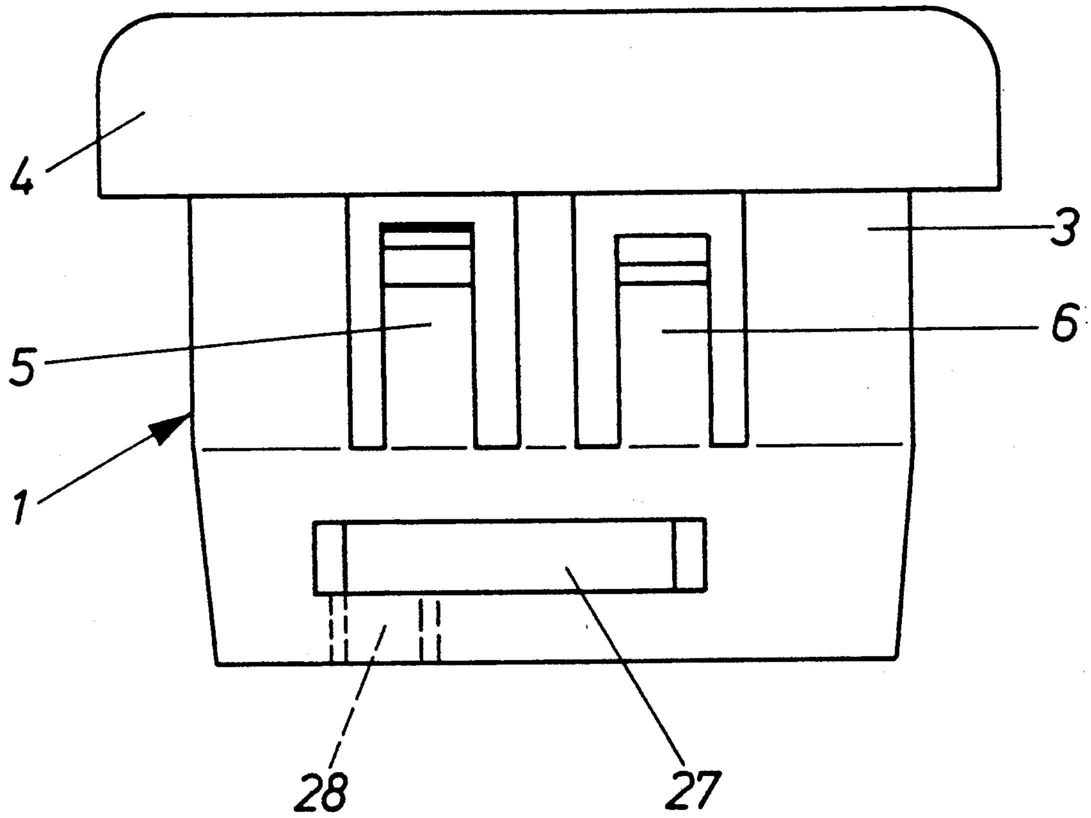
Figure 4:
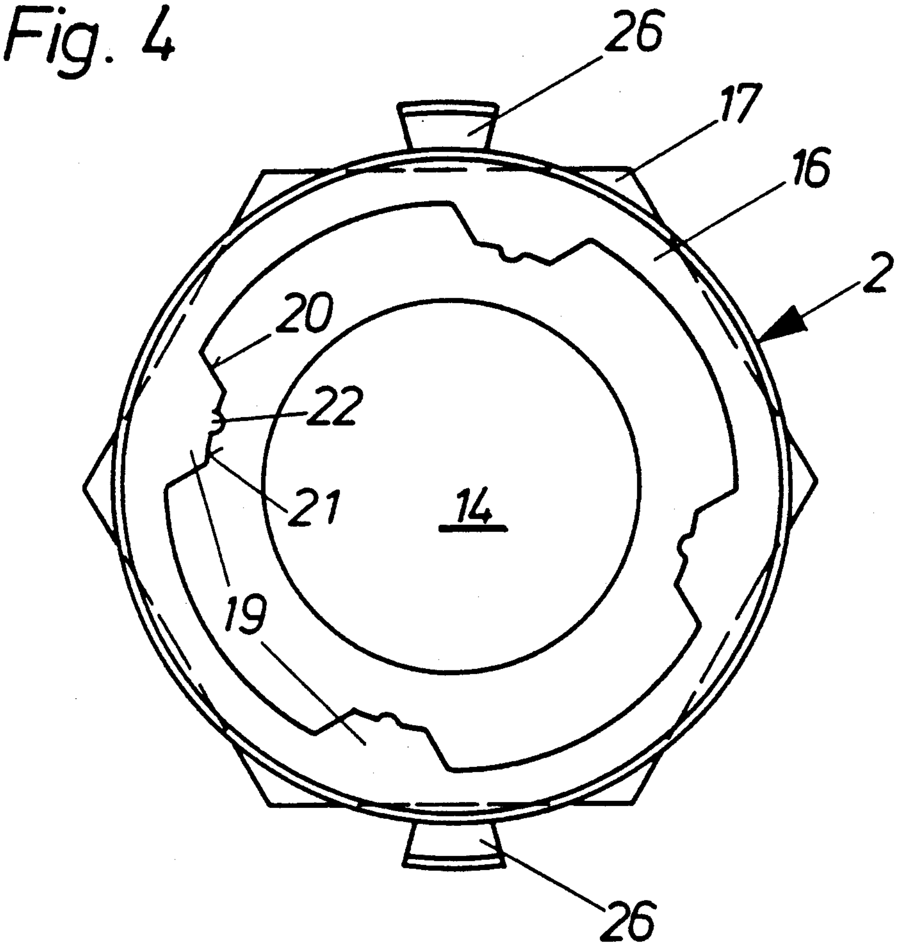
Figure 5:
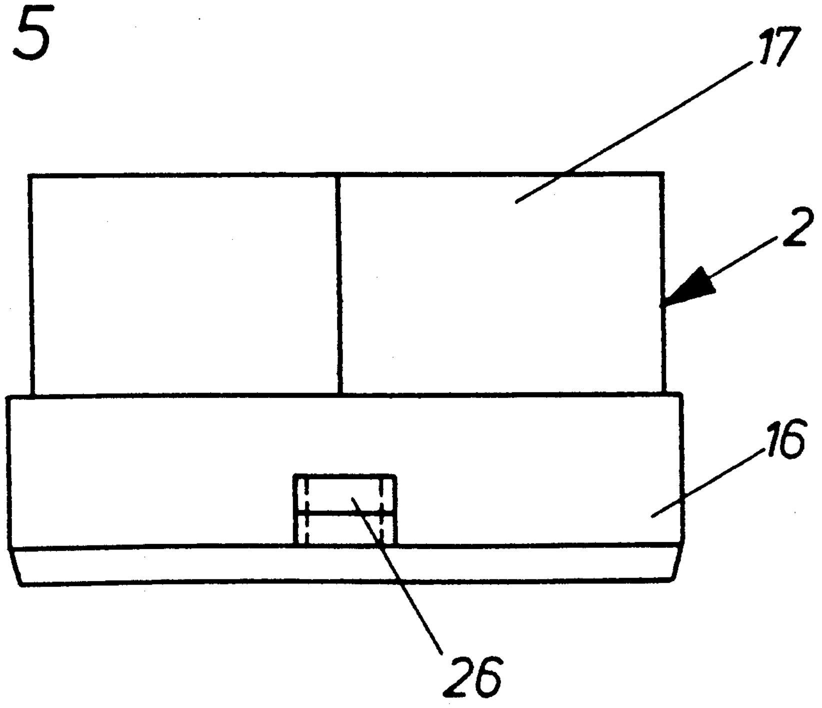
Figure 6:
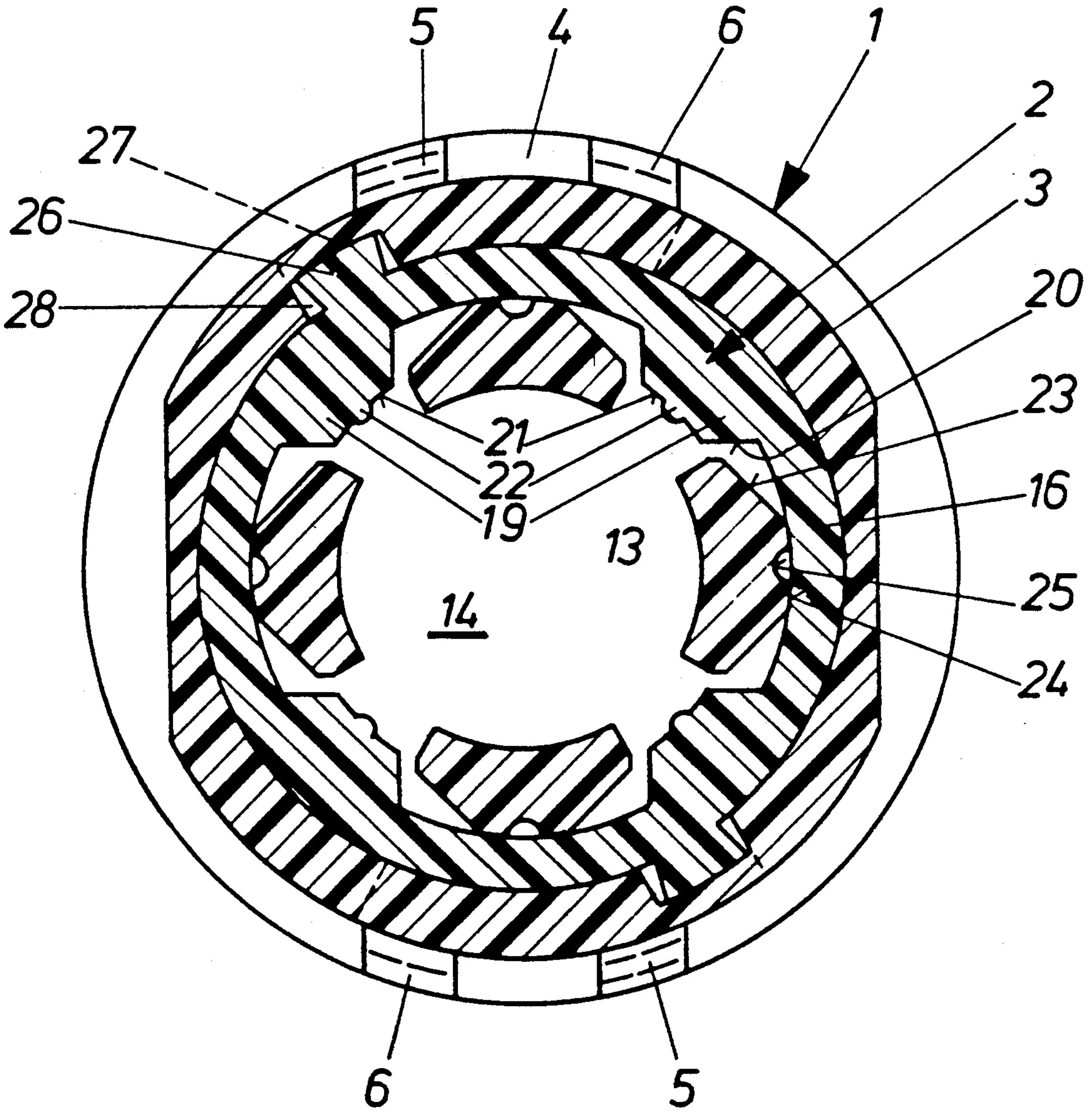
Figure 7:
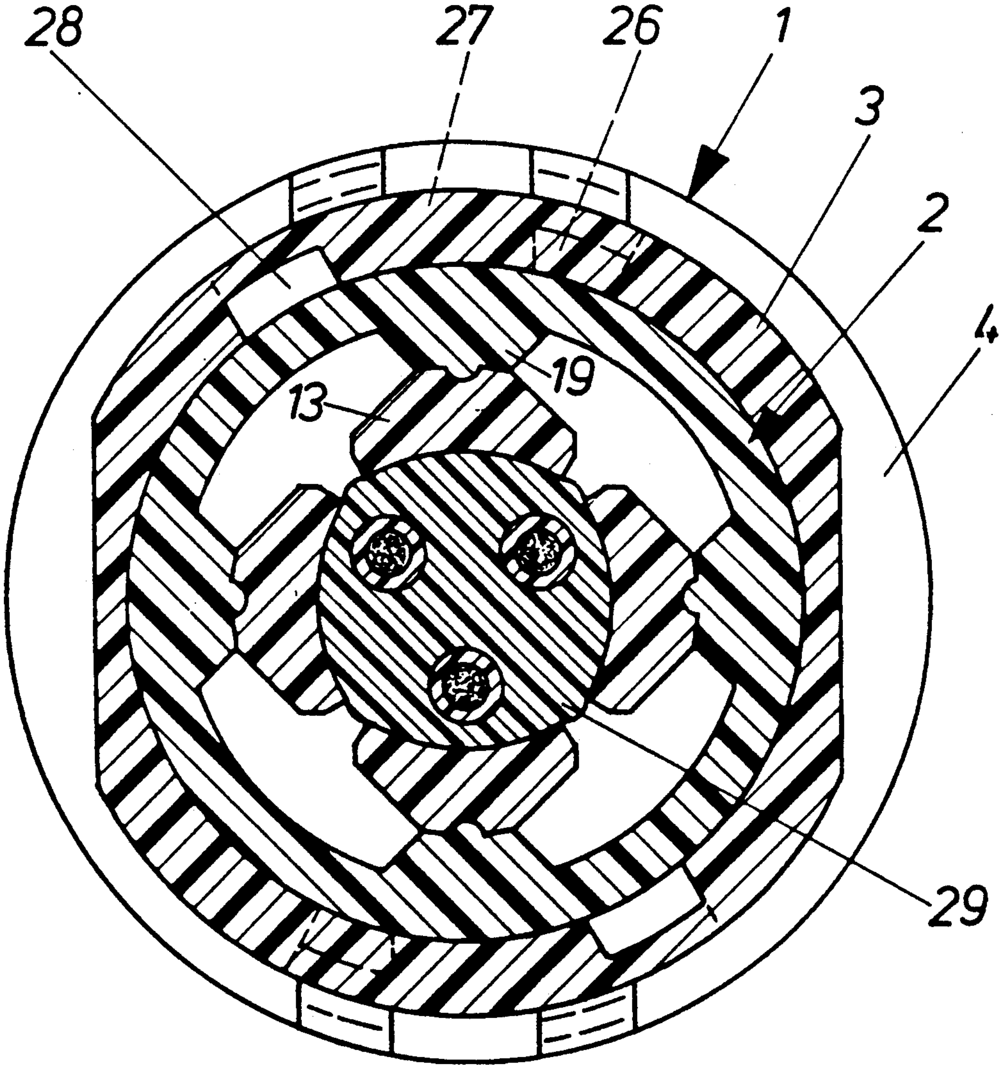

The invention is illustrated by way of example in the drawing and described in detail below with reference to the drawing, in which:

FIG. 1 shows a section through an embodiment of the device having four clamping arms, wherein the inner part has been pulled out of the outer part and the outer part is shown as a section along line I—I in FIG. 2, FIG. 2 shows a view of the outer part in the direction of arrows II in FIG. 1, FIG. 3 shows a plan view of the outer part according to FIG. 2, FIG. 4 shows a view of the inner part in the direction of arrows IV—IV in FIG. 1, wherein the inner part has been rotated into the correct position for inserting into the outer part according to FIG. 2, FIG. 5 shows a plan view of the outer part according to FIG. 4, FIG. 6 shows a section through the assembled device in the area of the line VI—VI in FIG. 1, wherein the clamping fingers are located in an inactive position, and FIG. 7 shows the same section as FIG. 6, wherein the clamping fingers clamp a three-core cable.

According to the drawing, the device for relieving the strain on cables consists of an outer part 1, which can be snapped into a housing opening, and also an inner part 2 which is mounted in this outer part 1 in such a way as to be rotatable at least by a certain angle.

The outer part 1 is provided with a supporting sleeve 3 which is essentially of cylindrical configuration and is provided at one end with a flange-like head 4 which, in the assembled state of the device, is normally to bear against the outer side of a housing. Provided on the supporting sleeve at a short distance from the head 4 are a plurality of freehand-blanked catch noses 5 and 6 which are arranged in a distributed manner over the periphery and are adapted to various housing wall thicknesses. On the side remote from the head 4, the catch noses 5 and 6 have slopes 7 protruding beyond the outer periphery of the supporting sleeve 3, while on the side facing the head 4 various catch steps 8 and 9 are provided on the catch noses. On two opposite sides, the supporting sleeve 3 is provided with flat sections 10 so that the sleeve can be inserted non-rotationally into a non-circular housing opening which is provided with corresponding lateral flat sections and in which the outer part 1 is secured non-rotationally. When the outer part is inserted into the housing bore, the catch noses 5 and 6 are pressed inwards due to the slopes 7 making contact and then spring out again when the edge of the housing opening is located between the head 4 and the catch noses 5 nd 6 respectively. Depending on the wall thickness, a corresponding step 8 or 9 engages behind the edge of the housing opening so that the outer part is secured in the housing wall not only non-rotationally but also in the axial direction.

Located on the head 4 is a trumpet-shaped cable lead-in 11 which merges into four clamping fingers 12 towards the interior of the outer part 1. The clamping fingers 12, sitting in one piece on the head 4, extend up to the other end of the outer part 1 and are provided at their free ends with clamping jaws 13 directed radially inwards.

The outer part 1 having the supporting sleeve 3, the flange-like head 4 and also the four clamping fingers 12 is designed as a one-piece plastic part, the plastic having to be at least slightly elastic so that the clamping fingers can be swivelled. In this respect, the swivelling direction of the clamping fingers runs transversely to the longitudinal axis of the central cable lead-through opening 14 running through both the outer part 1 and the inner part 2, the theoretical swivel axis following the head 4 lying in the base area of the clamping fingers 12. In practice, however, the swivelling movement is effected by bending the fingers 12 over their entire length.

An annular clearance space 15 is present between the supporting sleeve 3 and the four clamping fingers 12 arranged in a distributed manner over the periphery, into which clearance space 15 the inner part 2 is inserted from the side remote from the head 4 of the outer part 1, as shown in FIG. 1, although the inner part 2 has to be rotated slightly relative to the outer part 1.

On the side facing the outer part 1, the inner part 2 has a sleeve-shaped area 16 which extends continuously all round and whose wall thickness corresponds approximately to the height of the annular clearance space 15 of the outer part 1. Adjoining the sleeve-shaped area 16 towards the outside is a functional part 17 which is hexagonal in the outer peripheral area and onto which, for example, an open-ended spanner can be placed.

In the assembled state, the functional part 17, with its inner side, bears against the end face of the outer part 1 remote from the head 4. Just like the head 4 of the outer part, the functional part 17 also has a trumpet-shaped cable lead-in 18 so that on both sides of the device provision is made for a bend protector which makes additional bend-protector sockets unnecessary.

As can be recognized in particular from FIG. 4, run-up lobes 19 which have a run-up slope 20 are arranged on the inner surface of the sleeve-shaped area 16 of the inner part 2. In their highest area, the run-up lobes 19 are provided with inner cylindrical surfaces 21 in whose centre one catch projection 22 each extends in the longitudinal direction of the cable lead-through opening 14.

The run-up lobes 19 of the inner part interact with the clamping jaws 13 of the clamping fingers 12.

As can be recognized in particular from FIG. 6, a corresponding mating slope 23 on the clamping jaws 13 is allocated to each run-up slope 20 of the run-up lobes 19. The rear sides 24 of the clamping fingers 12 or clamping jaws 13 have the shape of an external cylinder which, in the inactive position, bears against the inner surface of the sleeve-shaped area 16 of the inner part 2, and in the clamping state bears against the respective inner cylindrical surface 21 of the run-up lobes 19, as illustrated in FIG. 7.

A corresponding catch recess 25 on the rear side 24 of the clamping jaws 13 is allocated to each catch projection 22 of the run-up lobes 19 so that a firm clamping grip can be achieved in the clamping position.

Used to fix the inner part 2 on the outer part 1 are two locking projections 26 which are provided on the outer surface of the sleeve-shaped area 16 of the inner part 2 and, in the assembled state, each engage into an annular slot 27 provided in the supporting sleeve 3 of the outer part 1. Used for inserting the locking projections 26 into the two annular slots 27 are two longitudinal grooves 28 which connect the annular slots 27 to the free end of the supporting sleeve. During assembly, therefore, the inner part 2 must be aligned relative to the outer part 1 in such a way that the locking projections 26 are in alignment with the longitudinal grooves 28. The inner part 2 can be turned when it has been pushed into its furthest position, the locking projections 26 then engaging into the respective annular slot 27 and thus axially fixing the inner part 2 in the outer part 1. The depth of the longitudinal grooves 28 is slightly smaller than the height of the locking projections 26; that is, the parts have to be deformed slightly when being assembled. In the final position, the locking projections 26 then engage into the annular groove and reliably hold the inner part 2 relative to the outer part 1 in the axial direction in any angular position. It is then no longer possible to release the parts without using special tools.

As revealed in particular from FIGS. 6 and 7, the annular slots 27 are made so long that they correspond exactly to the rotational displacement of the inner part 2 from the inactive position into the clamping position. This results in especially problem-free handling of the device.

In attaching the device, the outer part 1 together with the preassembled inner part 2 merely needs to be pushed into a housing opening. It is not necessary to use a tool here. During this procedure, the catch noses 5 and 6 respectively automatically locate their position and firmly hold the device in the housing opening.

Inserting a cable 29 is likewise very simple and problem-free. When the cable is inserted, the clamping fingers automatically swivel up outwards when coming into contact with the cable so that optimum utilization of the free lead-through cross-section is possible.

When the cable 29 has reached its final position and the clamping fit is to be set, the hexagonal functional part 17 of the inner part 2 is turned to the predetermined stop with a commercially available open-ended spanner, i.e. by about 45°. After turning, the inner part 2 is automatically located in its clamping position relative to the outer part 1.

Since the inner part 2 is closed all round, there is a firm connection with the functional part 17 provided with the external hexagon so that there is no risk of damaging the inner part 2. In addition, the inner part 2, as stated, can also be made of reinforced material, which need not be elastic.

By the presence of four clamping fingers 12 having relatively wide clamping jaws 13, it is possible to clamp the cable exactly in the centre of the lead-through opening. When being rotated into the clamping position, the inner part 2 does not come into contact at all with the cable 29 but merely transforms its rotational movement into a radial movement of the clamping fingers 12 or clamping jaws 13 so that the cable 29 cannot be displaced by the rotation of the inner part. The clamping fit produced is therefore optimum and has a quality not achieved hitherto which meets all specifications or even exceeds them.

LIST OF REFERENCE NUMERALS

1. Outer part
2. Inner part
3. Supporting sleeve
4. Flange-like head
5. Catch noses
6. Catch noses
7. Slope
8. Catch steps
9. Catch steps
10. Flat sections
11. Trumpet-shaped cable lead-in
12. Clamping fingers
13. Clamping jaws
14. Cable lead-through opening
15. Annular clearance space
16. Sleeve-shaped area
17. Functional part
18. Trumpet-shaped cable lead-in
19. Run-up lobe
20. Run-up slope
21. Inner cylindrical surfaces
22. Catch projections
23. Mating slope
24. Rear side
25. Catch recess
26. Locking projections
27. Annular slot
28. Longitudinal groove
29. Cable

I claim:

1. A device for relieving the strain on cables, in particular mains supply cables to housings of electrical equipment, consisting of two parts fitted into one another approximately concentrically, of which the outer part can be fastened in a housing opening and the inner part is mounted in the outer part so as to be rotatable around the lead-through opening for the cable, and also clamping fingers which protrude into the lead-through opening, the swivelling direction of said clamping fingers runs approximately transversely to the longitudinal axis of the cable lead-through opening and the clamping fingers can be swivelled into the lead-through opening by rotation of the inner part relative to the outer part and can be locked in a clamping position, wherein:
   - the clamping fingers are arranged on the outer part and lie approximately in the direction of the cable lead-through opening;
   - run-up lobes for actuating the clamping fingers sitting on the outer part are provided on the inner surface of the inner part; and
   - means for applying a gripping tool is formed on the end of the inner part protruding out of the outer part.

2. Device according to claim 1 for round cables, characterized in that three or more clamping fingers (12) are arranged in a uniformly distributed manner over a periphery of said lead through opening.

3. Device according to claim 1, characterized in that four clamping fingers (12) are provided.

4. Device according to claim 1, characterized in that the clamping fingers (12) sit on a head (4) of said outer part (1), extend up to the other end of the outer part (1) and are provided at their free ends with clamping jaws (13) directed radially inwards.

5. Device according to claim 1, characterized in that at least the outer part (1) is made of elastic plastic, and that the clamping fingers (12) are integrally formed in one piece on the head (4) of the outer part (1).

6. Device according to claim 1, characterized in that the inner part (2) is made of reinforced material.

7. Device according to claim 1, characterized in that an outer supporting sleeve (3) adjoins a head (4) of said outer part (1), which supporting sleeve (3) extends over the entire length of the outer part (1) and engages into the housing opening, and that an annular clearance space (15) is present between said outer supporting sleeve (3) and the clamping fingers (12), into which clearance space (15) the inner part (2) is inserted from the side remote from the head (4) of the outer part (1).

8. Device according to claim 7, characterized in that, in an inactive, unclamped position, a plurality inwardly directed run-up lobes (19) of the inner part (2) lie between the clamping fingers (12) sitting on the outer part (1).

9. Device according to claim 8, characterized in that a run-up slope (20) which has allocated to it a corresponding mating slope (23) on the respective clamping finger (12) is formed on each run-up lobe (19).

10. Device according to claim 1, characterized in that each run-up lobe (19), in its area projecting furthest inwards, has a catch projection (22) which has allocated to it one catch recess (25) each on the rear side (24) of each clamping finger (12).

11. Device according to claims 1, characterized in that at least one locking projection (26) directed radially outwards is arranged on the outer surface of the inner part (2), which locking projection (26) engages into an annular space or annular slot (27) formed on the inner surface of the supporting sleeve (3) of the outer part (1) and running transversely to the longitudinal direction.

12. Device according to claim 11, characterized in that the length of the annular slot (27) corresponds to the rotational displacement of the inner part (2) from an inactive position into the clamping position.

13. Device according to claim 11, characterized in that a longitudinal groove (28) which connects the annular slot (27) to the free end of the supporting sleeve (3) is provided on an inner surface of the supporting sleeve (3).

14. Device according to claim 13, characterized in that the depth of the longitudinal groove (28) is slightly smaller than the height of the projection (26) provided on the outer side of the inner part (2).

* * * * *